United States Patent
Sugano (10) Patent No.: US 12,134,362 B2
(45) Date of Patent: Nov. 5, 2024

(54) COLLISION DETECTING APPARATUS INCLUDING A THRESHOLD VARIABLY CONTROLLING UNIT FOR VEHICLE

(71) Applicant: SUBARU CORPORATION, Tokyo (JP)

(72) Inventor: Chihiro Sugano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 291 days.

(21) Appl. No.: 17/834,007

(22) Filed: Jun. 7, 2022

(65) Prior Publication Data

US 2022/0402451 A1 Dec. 22, 2022

(30) Foreign Application Priority Data

Jun. 22, 2021 (JP) .................................. 2021-103143

(51) Int. Cl.
| | |
|---|---|
| *B60R 21/0132* | (2006.01) |
| *B60R 21/36* | (2011.01) |
| *B60R 21/38* | (2011.01) |
| *G01L 5/00* | (2006.01) |
| *B60R 21/16* | (2006.01) |

(52) U.S. Cl.
CPC ........ *B60R 21/0132* (2013.01); *G01L 5/0052* (2013.01); *B60R 21/16* (2013.01); *B60R 21/36* (2013.01); *B60R 21/38* (2013.01)

(58) Field of Classification Search
None
See application file for complete search history.

(56) References Cited

U.S. PATENT DOCUMENTS

| | | | | |
|---|---|---|---|---|
| 6,513,383 | B1 * | 2/2003 | Okano | B60R 21/0133 |
| | | | | 73/514.34 |
| 7,104,354 | B2 * | 9/2006 | Ozaki | B60R 21/0136 |
| | | | | 180/282 |
| 9,725,059 | B2 * | 8/2017 | Okamura | B60R 21/0132 |
| 11,338,751 | B2 * | 5/2022 | Mase | B60R 21/0134 |
| 11,358,548 | B2 * | 6/2022 | Park | B60R 21/0136 |
| 2018/0229680 | A1 * | 8/2018 | Fujinami | B60R 21/0132 |

FOREIGN PATENT DOCUMENTS

JP          2015-009774 A       1/2015

* cited by examiner

*Primary Examiner* — Peter J Macchiarolo
*Assistant Examiner* — Jermaine L Jenkins
(74) *Attorney, Agent, or Firm* — TROUTMAN PEPPER HAMILTON SANDERS LLP (57) ABSTRACT

A collision detecting apparatus for a vehicle includes a bumper acceleration sensor, a floor acceleration sensor, a pressure sensor, and a processor including a vehicle collision determining unit and a threshold variably controlling unit. The vehicle collision determining unit is configured to determine a state of collision of the vehicle by comparing a detection value of the pressure sensor with a first threshold, and comparing a detection value of the bumper acceleration sensor with a second threshold when the detection value of the pressure sensor is greater than the first threshold. The threshold variably controlling unit is configured to change a threshold of the floor acceleration sensor from a third threshold to a fourth threshold in a case where: the detection value of the pressure sensor is greater than the first threshold; and the detection value of the bumper acceleration sensor is equal to or less than the second threshold.

13 Claims, 3 Drawing Sheets

COLLISION DETECTING APPARATUS INCLUDING A THRESHOLD VARIABLY CONTROLLING UNIT FOR VEHICLE

CROSS-REFERENCE TO RELATED APPLICATION

The present application claims priority from Japanese Patent Application No. 2021-103143 filed on Jun. 22, 2021, the entire contents of which are hereby incorporated by reference.

BACKGROUND

The technology relates to a collision detecting apparatus for a vehicle.

For example, Japanese Unexamined Patent Application Publication (JP-A) No. 2015-009774 discloses a collision detecting apparatus for a vehicle. The collision detecting apparatus includes an airbag ECU, a floor G-sensor (acceleration sensor), a front G-sensor, a pressure sensor, and an airbag device. The airbag ECU executes a collision determining process that determines a collision applied to the vehicle, on the basis of input signals supplied from the floor G-sensor, the front G-sensor, and the pressure sensor.

The floor G-sensor and the front G-sensor are each an acceleration sensor that detects the collision of the vehicle. The floor G-sensor is disposed on a floor of the vehicle at a location that is in the middle in a front-rear direction of the vehicle. The front G-sensor is disposed on each of right and left sides at a front part of the vehicle. The pressure sensor detects a bumper pressure of the vehicle, and is disposed on each of both sides substantially at a middle part inside a chamber member. The chamber member is provided in a bumper of the vehicle.

SUMMARY

An aspect of the technology provides a collision detecting apparatus for a vehicle. The collision detecting apparatus includes a bumper acceleration sensor, a floor acceleration sensor, a pressure sensor, and a processor including a vehicle collision determining unit and a threshold variably controlling unit. The bumper acceleration sensor is provided at a front part of the vehicle, and configured to detect an acceleration rate to be applied to the vehicle by a collision of the vehicle. The floor acceleration sensor is provided on a floor member of the vehicle. The pressure sensor extends in a vehicle width direction at the front part of the vehicle, and is configured to detect a pressure to be applied to the vehicle by the collision of the vehicle. The vehicle collision determining unit is configured to make a determination on a state of the collision of the vehicle by comparing a detection value obtained from the pressure sensor with a preset first threshold, and by comparing a detection value obtained from the bumper acceleration sensor with a preset second threshold in a case where the detection value obtained from the pressure sensor is greater than the first threshold. The threshold variably controlling unit is configured to variably control a threshold of the floor acceleration sensor on the basis of a result of the determination made by the vehicle collision determining unit, and configured to change the threshold of the floor acceleration sensor from a preset third threshold to a preset fourth threshold that is less than the third threshold in a case where the vehicle collision determining unit determines that: the detection value obtained from the pressure sensor is greater than the first threshold; and the detection value obtained from the bumper acceleration sensor is equal to or less than the second threshold.

An aspect of the technology provides a collision detecting apparatus for a vehicle. The collision detecting apparatus includes a bumper acceleration sensor, a floor acceleration sensor, a pressure sensor, and circuitry. The bumper acceleration sensor is provided at a front part of the vehicle, and configured to detect an acceleration rate to be applied to the vehicle by a collision of the vehicle. The floor acceleration sensor is provided on a floor member of the vehicle. The pressure sensor extends in a vehicle width direction at the front part of the vehicle, and is configured to detect a pressure to be applied to the vehicle by the collision of the vehicle. The circuitry is configured to make a determination on a state of the collision of the vehicle by comparing a detection value obtained from the pressure sensor with a preset first threshold, and by comparing a detection value obtained from the bumper acceleration sensor with a preset second threshold in a case where the detection value obtained from the pressure sensor is greater than the first threshold. The circuitry is configured to variably control a threshold of the floor acceleration sensor on the basis of a result of the determination on the state of the collision of the vehicle. The circuitry is configured to change the threshold of the floor acceleration sensor from a preset third threshold to a preset fourth threshold that is less than the third threshold in a case where: the detection value obtained from the pressure sensor is greater than the first threshold; and the detection value obtained from the bumper acceleration sensor is equal to or less than the second threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

A collision detecting apparatus for a vehicle, such as that disclosed in JP-A No. 2015-009774, includes an airbag ECU having three kinds of sensors including a floor G-sensor, a front G-sensor, and a pressure sensor. The airbag ECU is configured to determine a type of a collision of the vehicle, and discriminates between a collision that requires activation of an airbag device and a collision that does not require the activation of the airbag device.

For example, a result of detection based on the floor G-sensor becomes equal to or greater than a preset threshold but a result of detection based on the pressure sensor becomes equal to or less than the preset threshold, in a case where the vehicle travels over a curb and a collision is thus generated that does not involve a deformation of a bumper. In this case, the airbag ECU determines that the collision that requires the activation of the airbag device is not generated, on the basis of the result of the detection based on the pressure sensor which is less than the preset threshold.

However, a result of detection based on the floor G-sensor becomes equal to or greater than the preset threshold but a result of detection based on the front G-sensor becomes equal to or less than the preset threshold, in a case where a collision is generated, such as a pole collision or a offset collision, in which an energy of collision is concentrated on a local location of the vehicle in a region that is away from a position at which the front G-sensor is disposed. In this case, the airbag device may not possibly activate or the activation of the airbag device may possibly be delayed if the result of the detection based on the front G-sensor is less than the threshold described above, despite the generation of the collision, such as the pole collision, that requires the activation of the airbag device in terms of protection of an occupant.

It is desirable to provide a collision detecting apparatus for a vehicle that makes it possible to detect a local collision while reducing costs.

In the following, a collision detecting apparatus for a vehicle (hereinafter simply referred to as a "collision detecting apparatus") 10 according to some example embodiments of the technology is described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

In the following description, a vertical direction corresponds to a height direction of a vehicle 11, a right-left direction corresponds to a vehicle width direction of the vehicle 11, and a front-rear direction corresponds to an overall length direction of the vehicle 11.

Figure 1:
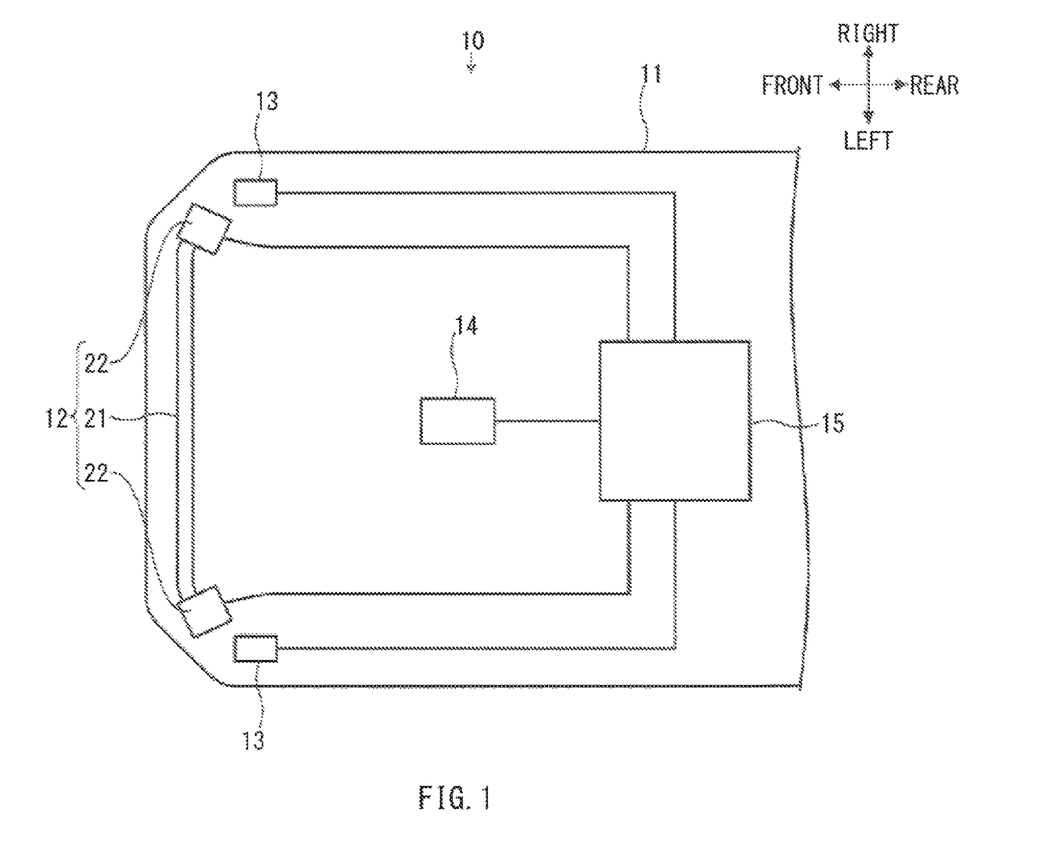
FIG. 1 is a diagram schematically illustrating a collision detecting apparatus for a vehicle according to one example embodiment of the technology.
Figure 2:
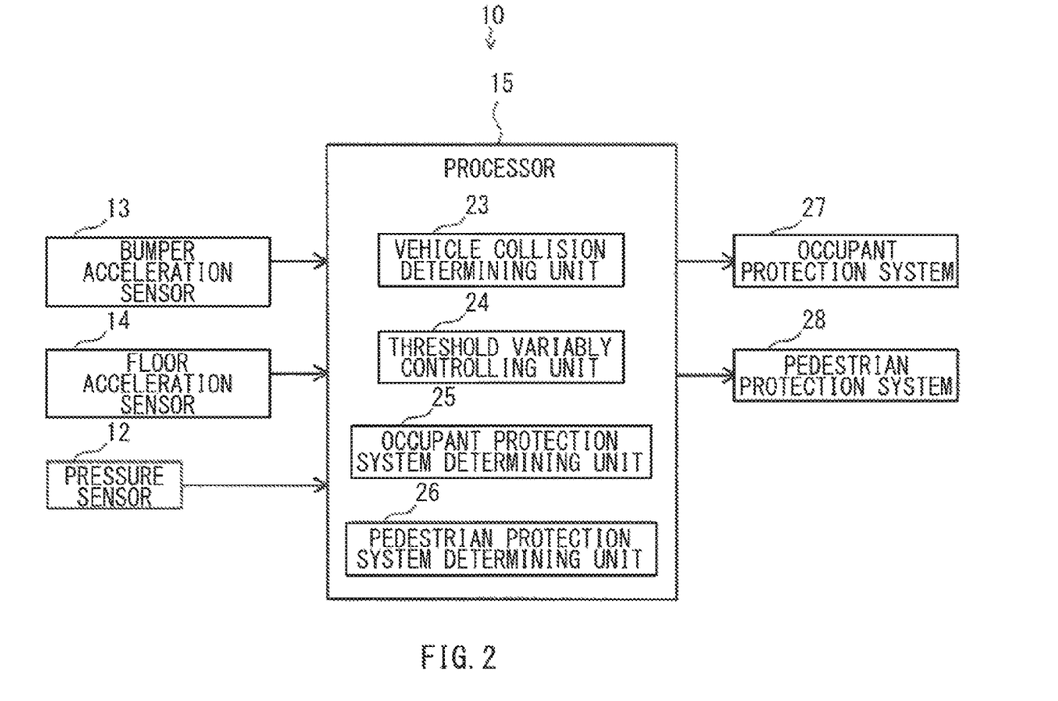
FIG. 2 is a block diagram illustrating the collision detecting apparatus for the vehicle according to one example embodiment of the technology.

FIG. 1 is a diagram schematically illustrating the collision detecting apparatus 10 according to an example embodiment. FIG. 2 is a block diagram illustrating the collision detecting apparatus 10 according to an example embodiment.

Referring to FIG. 1, the collision detecting apparatus 10 includes a pressure sensor 12, a bumper acceleration sensor 13, a floor acceleration sensor 14, and a processor 15. The pressure sensor 12 may be disposed at a front-end part of the vehicle 11. The bumper acceleration sensor 13 may be disposed at least at each of corners that are positioned in the vehicle width direction at the front-end part of the vehicle 11. The floor acceleration sensor 14 may be disposed on an unillustrated floor member at a location that is substantially in the middle in the front-rear direction of the vehicle 11. The processor 15 may control the collision detecting apparatus 10 on the basis of detection values obtained from the pressure sensor 12, the bumper acceleration sensor 13, and the floor acceleration sensor 14.

The pressure sensor 12 may be used to determine a necessity of activation of a pedestrian protection system 28 illustrated in FIG. 2. For example, the pressure sensor 12 may be a pressure fluctuation sensor. The pressure sensor 12 may include a detection tube 21 and a pressure detection element 22. The pressure detection element 22 may be disposed at each of both ends of the detection tube 21. As described later in greater detail, the collision detecting apparatus 10 according to an example embodiment may determine a necessity of activation of an occupant protection system 27 illustrated in FIG. 2 by means of the pressure sensor 12, and variably controls a threshold of the floor acceleration sensor 14 on the basis of, for example, a detection value P obtained from the pressure sensor 12.

The detection tube 21 may be, for example, a pipe-shaped resin member having a circular cross section and whose inside is substantially sealed. The detection tube 21 may be disposed inside an unillustrated shock-absorbing foamed member. The shock-absorbing foamed member may be disposed on a front face of an unillustrated bumper supporting member that structures an unillustrated bumper of the vehicle 11. As illustrated in FIG. 1, the detection tube 21 may be so disposed as to extend from a right end of the front-end part of the vehicle 11 to a left end of the front-end part of the vehicle 11, and disposed in the vehicle width direction between the bumper acceleration sensors 13.

The pressure detection elements 22 each may detect a change in pressure upon compression of the detection tube 21 caused by an impact of a collision of an obstacle with the bumper of the vehicle 11. Non-limiting examples of the obstacle may include a pedestrian, another vehicle, and a pole. The pressure detection elements 22 each may supply the detection value P upon the collision to the processor 15.

The bumper acceleration sensors 13 each may be used to determine the necessity of the activation of the occupant protection system 27. The bumper acceleration sensors 13 each may be disposed on an inner side of an unillustrated bumper skin of the vehicle 11. The bumper acceleration sensors 13 each may detect a magnitude of an acceleration rate generated at the vehicle 11 by the impact of the collision of the obstacle with the bumper of the vehicle 11. The bumper acceleration sensors 13 each may supply, to the processor 15, a detection value Gb upon the collision of the obstacle with the vehicle 11.

In an example embodiment, two bumper acceleration sensors 13 may be disposed at the corners positioned in the vehicle width direction at the front-end part of the vehicle 11 as illustrated in FIG. 1, although the locations at which the bumper acceleration sensors 13 are provided are not limited thereto. In some embodiments, three bumper acceleration sensors 13 may be disposed at the front-end part of the vehicle 11, including the one disposed at a location that is substantially in the middle in the vehicle width direction of the front-end part of the vehicle 11. The number of bumper acceleration sensors 13 and the locations at which the bumper acceleration sensors 13 are provided are optional and may be varied on an as-necessary basis depending on design requirement.

The floor acceleration sensor 14 may be used to determine the necessity of the activation of the occupant protection system 27. The floor acceleration sensor 14 may detect a magnitude of an acceleration rate generated at the vehicle 11 upon the collision of the obstacle with the vehicle 11. As described later in greater detail, the floor acceleration sensor 14 may supply, to the processor 15, a detection value Gf that is at the time of the collision of the obstacle with the vehicle 11. Further, in the collision detecting apparatus 10 according to an example embodiment, the processor 15 may activate the occupant protection system 27 immediately to protect an occupant of the vehicle 11, in a case where the detection value Gf obtained from the floor acceleration sensor 14 is equal to or greater than a preset third threshold.

The processor 15 may have devices including, for example, a central processing unit (CPU), a read-only memory (ROM), and a random-access memory (RAM). The processor 15 may be or may include an electronic control unit (ECU) that executes, for example, various calculations that control the collision detecting apparatus 10.

The processor 15 may include an unillustrated storage. For example, the storage may be a non-volatile memory such as an electrically erasable programmable read-only memory (EEPROM). The storage may contain various pieces of data necessary for a control of the vehicle 11. The storage may contain, as one of the pieces of data, first to fifth thresholds to be used by the collision detecting apparatus 10 to determine the necessity of the activation of the occupant protection system 27 and the pedestrian protection system 28.

Referring to FIG. 2, the processor 15 of the collision detecting apparatus 10 includes, for example, a vehicle collision determining unit 23 and a threshold variably controlling unit 24. The processor 15 may also include, for example, an occupant protection system determining unit 25 and a pedestrian protection system determining unit 26. The processor 15 may be coupled to: the occupant protection system 27 that protects the occupant upon the collision of the vehicle 11; and the pedestrian protection system 28 that protects the pedestrian. The processor 15 may cause one or both of the occupant protection system 27 and the pedestrian protection system 28 to activate on an as-necessary basis, on the basis of a result of the determination mentioned above.

The vehicle collision determining unit 23 may first compare the detection value P with the first threshold set in advance to the storage, in a case where a collision has generated at the front-end part of the vehicle 11 and the detection value P is supplied to the processor 15 from the pressure sensor 12. In an example embodiment, the first threshold may have a value greater than a threshold for the pedestrian protection system 28 to activate, and may be used to detect the collision of the obstacle other than the pedestrian, such as another vehicle or the pole, with the vehicle 11.

The vehicle collision determining unit 23 may compare the detection value Gb obtained from the bumper acceleration sensor 13 with the second threshold set in advance to the storage, in a case where the detection value P is greater than the first threshold. In a case where the detection value Gb is equal to or less than the second threshold, the vehicle collision determining unit 23 may determine that there is a possibility of the collision of the obstacle other than the pedestrian, such as another vehicle or the pole, with the vehicle 11. In an example embodiment, the second threshold may be used to determine a change in threshold of the floor acceleration sensor 14.

The threshold variably controlling unit 24 may change the threshold of the floor acceleration sensor 14 from the preset third threshold to the fourth threshold, in a case where the vehicle collision determining unit 23 has determined that there is a possibility of the collision of the obstacle other than the pedestrian with the vehicle 11. In an example embodiment, the third threshold may be used to determine the necessity of the activation of the occupant protection system 27. In an example embodiment, the fourth threshold may have a value less than the third threshold, and may be used to determine a local collision of the vehicle 11.

The occupant protection system determining unit 25 may compare the detection value Gf obtained from the floor acceleration sensor 14 with the third threshold or the fourth threshold, and determine the necessity of the activation of the occupant protection system 27. In a case where the occupant protection system determining unit 25 has determined that the activation of the occupant protection system 27 is necessary, the processor 15 may expand and inflate an unillustrated airbag device provided in a vehicle compartment and structuring the occupant protection system 27.

The pedestrian protection system determining unit 26 may compare the detection value P obtained from the pressure sensor 12 with the fifth threshold, and determine the necessity of the activation of the pedestrian protection system 28. In a case where the pedestrian protection system determining unit 26 has determined that the activation of the pedestrian protection system 28 is necessary, the processor 15 may cause an unillustrated pop-up hood device structuring the pedestrian protection system 28 to activate, and may expand and inflate an unillustrated airbag device provided outside the vehicle compartment. In an example embodiment, the fifth threshold may have a value less than the first threshold, and may be used to determine the necessity of the activation of the pedestrian protection system 28.

Figure 3:
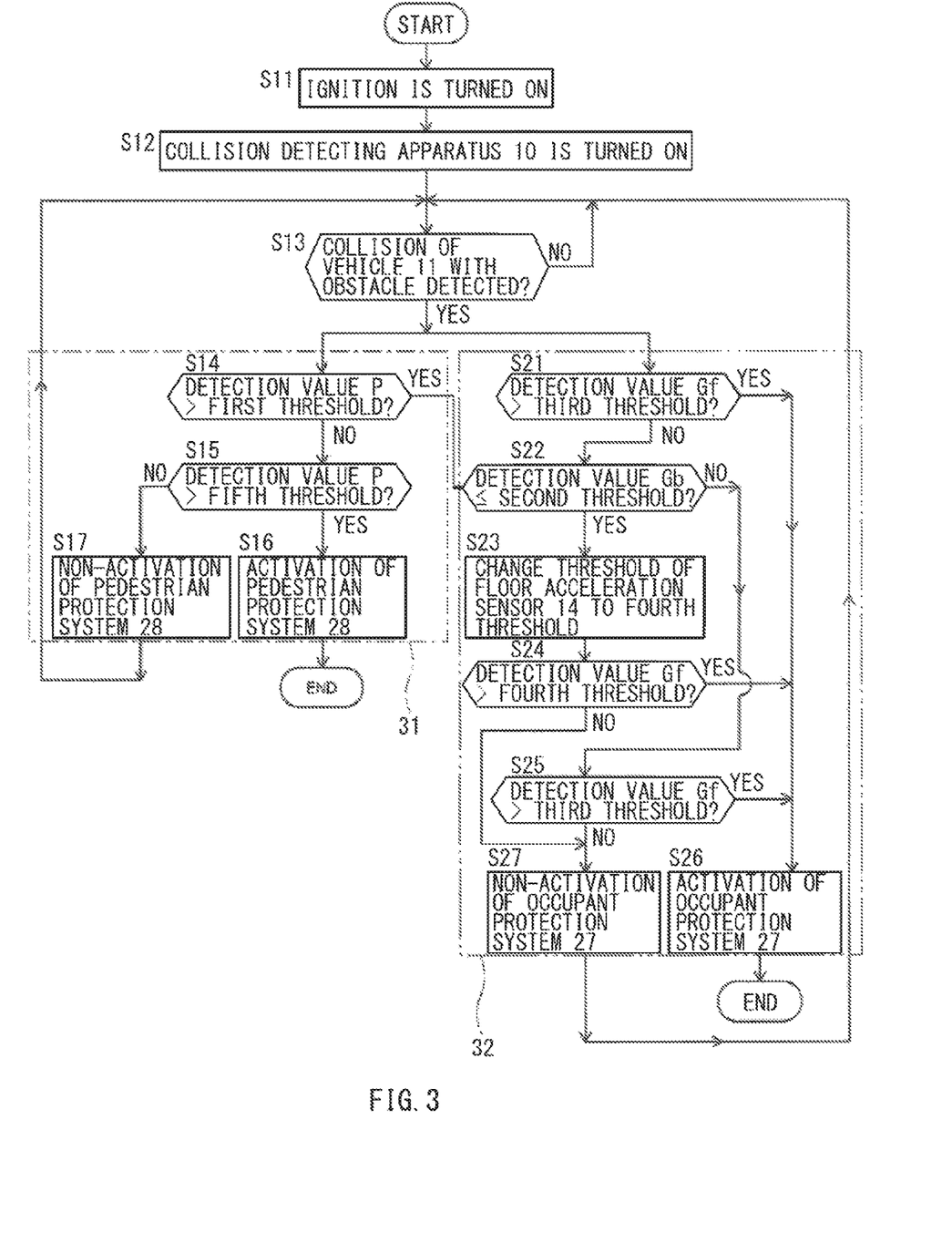
FIG. 3 is a flowchart illustrating a control method to be performed by the collision detecting apparatus for the vehicle according to one example embodiment of the technology.

FIG. 3 is a flowchart illustrating a method of detecting a collision of the vehicle 11 by the collision detecting apparatus 10 according to an example embodiment. It should be noted that steps inside a frame surrounded by a dashed-dotted line 31 belong to a control method to be performed by the pedestrian protection system 28, and steps inside a frame surrounded by a dashed-two dotted line 32 belong to a control method to be performed by the occupant protection system 27.

Referring to FIG. 3, in step S11, the vehicle 11 may be placed into an ignition-ON state, in a case where the occupant such as a driver boards the vehicle 11 and presses an unillustrated ignition switch. In step S12, the collision detecting apparatus 10 may be turned on in response to the pressing of the ignition switch. In step S13, the collision detecting apparatus 10 may start detecting the collision of the vehicle 11 with the obstacle. Non-limiting examples of the obstacle may include another vehicle, the pedestrian, and the pole.

The collision detecting apparatus 10 may detect the collision of the vehicle 11 with the obstacle (step S13: YES), in a case where at least one of the detection value P obtained from the pressure sensor 12, the detection value Gb obtained from the bumper acceleration sensor 13, or the detection value Gf obtained from the floor acceleration sensor 14 is supplied to the processor 15.

If at least one of the detection value P obtained from the pressure sensor 12, the detection value Gb obtained from the bumper acceleration sensor 13, or the detection value Gf obtained from the floor acceleration sensor 14 is not supplied to the processor 15 (step S13: NO), the collision detecting apparatus 10 may continue monitoring the collision of the vehicle 11 without detecting the collision of the vehicle 11 with the obstacle.

In step S14, the vehicle collision determining unit 23 may compare the detection value P with the first threshold set in advance to the storage of the processor 15, in a case where the detection value P obtained from the pressure sensor 12 is supplied to the processor 15.

If the vehicle collision determining unit 23 determines that the detection value P is greater than the first threshold (step S14: YES), the method may proceed to step S22. In step S22, the vehicle collision determining unit 23 may compare the detection value Gb obtained from the bumper acceleration sensor 13 with the second threshold set in advance to the storage of the processor 15. It should be noted that the vehicle collision determining unit 23 may make the YES determination in step S22 if one of the detection values Gb obtained from the two or more bumper acceleration sensors 13 is equal to or less than the second threshold, in a case where the detection values Gb are supplied from the respective two or more bumper acceleration sensors 13.

If the vehicle collision determining unit 23 determines that the detection value Gb is equal to or less than the second threshold (step S22: YES), the method may proceed to step S23. In step S23, the threshold variably controlling unit 24 may change the threshold of the floor acceleration sensor 14 from the third threshold to the fourth threshold. It should be noted that the vehicle collision determining unit 23 may make the YES determination in step S22 and the method may proceed to step S23 in which the threshold variably controlling unit 24 may change the threshold of the floor acceleration sensor 14 from the third threshold to the fourth threshold, in a case where no detection result is obtained from the bumper acceleration sensors 13.

In step S24, the occupant protection system determining unit 25 may compare the detection value Gf obtained from the floor acceleration sensor 14 with the fourth threshold, and determine the necessity of the activation of the occupant protection system 27. If the occupant protection system determining unit 25 determines that the detection value Gf is greater than the fourth threshold (step S24: YES), the occupant protection system determining unit 25 may determine that the activation of the occupant protection system 27 is necessary, and the method may proceed to step S26.

In step S26, the processor 15 may control the occupant protection system 27 to expand and inflate the unillustrated airbag device provided in the vehicle 11 and structuring the occupant protection system 27, thereby protecting the occupant.

If the occupant protection system determining unit 25 determines that the detection value Gf is equal to or less than the fourth threshold (step S24: NO), the occupant protection system determining unit 25 may determine that the activation of the occupant protection system 27 is not necessary, and the method may proceed to step S27.

In step S27, the processor 15 may cause the method to proceed to step S13 without activating the occupant protection system 27, and the collision detecting apparatus 10 may continue monitoring the collision of the vehicle 11.

If the vehicle collision determining unit 23 determines that the detection value Gb is greater than the second threshold (step S22: NO), the method may proceed to step S25. In step S25, the threshold variably controlling unit 24 may maintain the threshold of the floor acceleration sensor 14 to the third threshold. Further, the occupant protection system determining unit 25 may compare the detection value Gf with the third threshold, and determine the necessity of the activation of the occupant protection system 27.

If the occupant protection system determining unit 25 determines that the detection value Gf is greater than the third threshold (step S25: YES), the occupant protection system determining unit 25 may determine that the activation of the occupant protection system 27 is necessary, and the method may proceed to step S26. In step S26, the occupant protection system 27 may be activated to protect the occupant as described above.

If the occupant protection system determining unit 25 determines that the detection value Gf is equal to or less than the third threshold (step S25: NO), the occupant protection system determining unit 25 may determine that the activation of the occupant protection system 27 is not necessary, and the method may proceed to step S27. In step S27, the processor 15 may cause the method to proceed to step S13 without activating the occupant protection system 27, and the collision detecting apparatus 10 may continue monitoring the collision of the vehicle 11.

In step S21, in a case where the detection value Gf obtained from the floor acceleration sensor 14 is supplied to the processor 15 in the occupant protection system 27, the occupant protection system determining unit 25 may compare the detection value Gf with the third threshold set in advance to the storage of the processor 15.

If the occupant protection system determining unit 25 determines that the detection value Gf is greater than the third threshold (step S21: YES), the method may proceed to step S26. In step S26, the occupant protection system 27 may be activated to protect the occupant as described above.

If the occupant protection system determining unit 25 determines that the detection value Gf is equal to or less than the third threshold (step S21: NO), the method may proceed to step S22. In this case, the occupant protection system determining unit 25 once determines that the activation of the occupant protection system 27 is not necessary, but may cause the method to proceed to the control of the collision detecting apparatus 10 performed in and after step S22 in consideration of a possibility of a local collision with the vehicle 11, such as a pole collision or an offset collision of the vehicle 11.

If the vehicle collision determining unit 23 determines that the detection value P is equal to or less than the first threshold in the pedestrian protection system 28 (step S14: NO), the method may proceed to step S15.

In step S15, the pedestrian protection system determining unit 26 may compare the detection value P with the fifth threshold, and determine the necessity of the activation of the pedestrian protection system 28. If the pedestrian protection system determining unit 26 determines that the detection value P is greater than the fifth threshold (step S15: YES), the pedestrian protection system determining unit 26 may determine that the activation of the pedestrian protection system 28 is necessary, and the method may proceed to step S16.

In step S16, the processor 15 may control the pedestrian protection system 28 to activate the pop-up hood device structuring the pedestrian protection system 28 and to expand and inflate the unillustrated airbag device provided outside the vehicle 11, thereby protecting the occupant.

If the pedestrian protection system determining unit 26 determines that the detection value P is equal to or less than the fifth threshold (step S15: NO), the pedestrian protection system determining unit 26 may determine that the activation of the pedestrian protection system 28 is not necessary, and the method may proceed to step S17.

In step S17, the processor 15 may cause the method to proceed to step S13 without activating the pedestrian protection system 28, and the collision detecting apparatus 10 may continue monitoring the collision of the vehicle 11.

In the collision detecting apparatus 10, the occupant protection system determining unit 25 may once determine that the activation of the occupant protection system 27 is not necessary as a result of the determination performed in step S21 that uses the detection value Gf obtained from the floor acceleration sensor 14 as described above. In this case, in the collision detecting apparatus 10, the determination may be made again on the basis of the detection value P obtained from the pressure sensor 12 and the detection value Gb obtained from the bumper acceleration sensor 13, and the threshold of the floor acceleration sensor 14 may be changed to the fourth threshold in step S23.

Further, the occupant protection system determining unit 25 may make the determination again on the basis of the fourth threshold. This makes it easier to determine the local collision with the vehicle 11, such as the pole collision or the offset collision of the vehicle 11. It should be noted that it is difficult to determine the local collision with the vehicle 11 solely on the basis of the floor acceleration sensor 14. Hence, it helps to execute the determination of the collision with good accuracy even in a case where the local collision with the vehicle 11 is generated, and to appropriately protect the occupant of the vehicle 11.

The collision detecting apparatus 10 may also make the determination of the local collision of the vehicle 11 stepwise in steps S14 and S22 on the basis of the detection value P obtained from the pressure sensor 12 and the detection value Gb obtained from the bumper acceleration sensor 13, upon detecting the local collision of the vehicle 11. For example, the activation of the occupant protection system 27 may sometimes be unnecessary in a case where the vehicle 11 collides with an obstacle such as a wall upon low-speed traveling.

Upon such a collision of the vehicle 11, the bumper of the vehicle 11 collides with the wall, causing the detection value P obtained from the pressure sensor 12 to be greater than the first threshold and the detection value Gb obtained from the bumper acceleration sensor 13 to be greater than the second threshold as well. It should be noted that the detection value Gf obtained from the floor acceleration sensor 14 becomes equal to or less than the third threshold due to a small impact upon the collision.

In this case, the collision detecting apparatus 10 may make the determination of the collision of the vehicle 11 again in step S25 with the third threshold being maintained, without changing the threshold of the floor acceleration sensor 14 to the fourth threshold. Thus, the occupant protection system determining unit 25 may determine that the activation of the occupant protection system 27 is not necessary. Hence, it helps to prevent unnecessary expansion and inflation of the airbag device provided in the vehicle 11 and structuring the occupant protection system 27, and to reduce costs associated with setting the airbag device again.

Further, the collision detecting apparatus 10 may first compare the detection value P obtained from the pressure sensor 12 with the first threshold that is set to a higher value than the fifth threshold that is used to determine the activation of the pedestrian protection system 28. This also helps to determine the local collision with the vehicle 11 which is clearly different from the collision of the pedestrian with the bumper of the vehicle 11 in terms of a change in pressure, such as the offset collision caused by another vehicle or the pole collision.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As used herein, the term "collision" may be used interchangeably with the term "contact".

The processor 15 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 15 illustrated in FIG. 2.

The invention claimed is:

1. A collision detecting apparatus for a vehicle, the collision detecting apparatus comprising:

a bumper acceleration sensor provided at a front part of the vehicle, and configured to detect an acceleration rate to be applied to the vehicle by a collision of the vehicle;

a floor acceleration sensor provided on a floor member of the vehicle;

a pressure sensor extending in a vehicle width direction at the front part of the vehicle, and configured to detect a pressure to be applied to the vehicle by the collision of the vehicle; and a processor and a memory communicably coupled to the processor, the memory storing instructions for causing the processor to execute the instructions including making a determination on a state of the collision of the vehicle by comparing a detection value obtained from the pressure sensor with a preset first threshold, and by comparing a detection value obtained from the bumper acceleration sensor with a preset second threshold in a case where the detection value obtained from the pressure sensor is greater than the first threshold, and controlling a threshold of the floor acceleration sensor on a basis of a result of the determination made on the state of the collision, and configured to change the threshold of the floor acceleration sensor from a preset third threshold to a preset fourth threshold that is less than the third threshold in a case where the processor determines that: the detection value obtained from the pressure sensor is greater than the first threshold; and the detection value obtained from the bumper acceleration sensor is equal to or less than the second threshold.

2. The collision detecting apparatus for the vehicle according to claim 1, wherein the processor is configured to execute the instructions to determine a necessity of activation of an occupant protection system provided in the vehicle, on a basis of a detection value obtained from the floor acceleration sensor, wherein the processor is further configured to execute the instructions to determine that the activation of the occupant protection system is necessary, in a case where the occupant protection system determining unit determines that the detection value obtained from the floor acceleration sensor is greater than the fourth threshold.

3. The collision detecting apparatus for the vehicle according to claim 2, wherein the processor is configured to execute the instructions to determine a necessity of activation of a pedestrian protection system, on a basis of the detection value obtained from the pressure sensor, the pedestrian protection system being configured to protect a pedestrian to be collided with the vehicle, wherein the processor is further configured to execute the instructions to determine that the activation of the pedestrian protection system is necessary, in a case where: the processor determines that the detection value obtained from the pressure sensor is equal to or less than the first threshold; and the processor determines that the detection value obtained from the pressure sensor is greater than a preset fifth threshold that is less than the first threshold.

4. The collision detecting apparatus for the vehicle according to claim 3, wherein the bumper acceleration sensor comprises acceleration sensors disposed at least at respective corners that are positioned in the vehicle width direction at the front part of the vehicle, and the pressure sensor includes:

a detection tube extending in the vehicle width direction of the vehicle, and provided at a front-end part of the vehicle between the bumper acceleration sensors; and a pressure detection element provided at each of both ends of the detection tube.

5. The collision detecting apparatus for the vehicle according to claim 2, wherein the bumper acceleration sensor comprises acceleration sensors disposed at least at respective corners that are positioned in the vehicle width direction at the front part of the vehicle, and the pressure sensor includes:

a detection tube extending in the vehicle width direction of the vehicle, and provided at a front-end part of the vehicle between the bumper acceleration sensors; and a pressure detection element provided at each of both ends of the detection tube.

6. The collision detecting apparatus for the vehicle according to claim 1, wherein the processor is configured to execute the instructions to determine a necessity of activation of an occupant protection system provided in the vehicle, on a basis of a detection value obtained from the floor acceleration sensor, wherein the processor is further configured to execute the instructions to determine that the activation of the occupant protection system is necessary regardless of the detection value obtained from the pressure sensor or the detection value obtained from the bumper acceleration sensor, in a case where the processor determines that the detection value obtained from the floor acceleration sensor is greater than the third threshold.

7. The collision detecting apparatus for the vehicle according to claim 6, wherein the processor is configured to execute the instructions to determine a necessity of activation of a pedestrian protection system, on a basis of the detection value obtained from the pressure sensor, the pedestrian protection system being configured to protect a pedestrian to be collided with the vehicle, wherein the processor is further configured to execute the instructions to determine that the activation of the pedestrian protection system is necessary, in a case where: the processor determines that the detection value obtained from the pressure sensor is equal to or less than the first threshold; and the processor determines that the detection value obtained from the pressure sensor is greater than a preset fifth threshold that is less than the first threshold.

8. The collision detecting apparatus for the vehicle according to claim 7, wherein the bumper acceleration sensor comprises acceleration sensors disposed at least at respective corners that are positioned in the vehicle width direction at the front part of the vehicle, and the pressure sensor includes:

a detection tube extending in the vehicle width direction of the vehicle, and provided at a front-end part of the vehicle between the bumper acceleration sensors; and a pressure detection element provided at each of both ends of the detection tube.

9. The collision detecting apparatus for the vehicle according to claim 6, wherein the bumper acceleration sensor comprises acceleration sensors disposed at least at respective corners that are positioned in the vehicle width direction at the front part of the vehicle, and the pressure sensor includes:

a detection tube extending in the vehicle width direction of the vehicle, and provided at a front-end part of the vehicle between the bumper acceleration sensors; and a pressure detection element provided at each of both ends of the detection tube.

10. The collision detecting apparatus for the vehicle according to claim 1, wherein the processor is configured to execute the instructions to determine a necessity of activation of a pedestrian protection system, on a basis of the detection value obtained from the pressure sensor, the pedestrian protection system being configured to protect a pedestrian to be collided with the vehicle, wherein the processor is further configured to execute the instructions to determine that the activation of the pedestrian protection system is necessary, in a case where: the processor determines that the detection value obtained from the pressure sensor is equal to or less than the first threshold; and the processor determines that the detection value obtained from the pressure sensor is greater than a preset fifth threshold that is less than the first threshold.

11. The collision detecting apparatus for the vehicle according to claim 10, wherein the bumper acceleration sensor comprises acceleration sensors disposed at least at respective corners that are positioned in the vehicle width direction at the front part of the vehicle, and the pressure sensor includes:

a detection tube extending in the vehicle width direction of the vehicle, and provided at a front-end part of the vehicle between the bumper acceleration sensors; and a pressure detection element provided at each of both ends of the detection tube.

12. The collision detecting apparatus for the vehicle according to claim 1, wherein the bumper acceleration sensor comprises acceleration sensors disposed at least at respective corners that are positioned in the vehicle width direction at the front part of the vehicle, and the pressure sensor includes:
- a detection tube extending in the vehicle width direction of the vehicle, and provided at a front-end part of the vehicle between the bumper acceleration sensors; and
- a pressure detection element provided at each of both ends of the detection tube.

13. A collision detecting apparatus for a vehicle, the collision detecting apparatus comprising:
- a bumper acceleration sensor provided at a front part of the vehicle, and configured to detect an acceleration rate to be applied to the vehicle by a collision of the vehicle;
- a floor acceleration sensor provided on a floor member of the vehicle;
- a pressure sensor extending in a vehicle width direction at the front part of the vehicle, and configured to detect a pressure to be applied to the vehicle by the collision of the vehicle; and
- circuitry configured to
    - make a determination on a state of the collision of the vehicle by comparing a detection value obtained from the pressure sensor with a preset first threshold, and by comparing a detection value obtained from the bumper acceleration sensor with a preset second threshold in a case where the detection value obtained from the pressure sensor is greater than the first threshold,
    - variably control a threshold of the floor acceleration sensor on a basis of a result of the determination on the state of the collision of the vehicle, and
    - change the threshold of the floor acceleration sensor from a preset third threshold to a preset fourth threshold that is less than the third threshold in a case where: the detection value obtained from the pressure sensor is greater than the first threshold; and the detection value obtained from the bumper acceleration sensor is equal to or less than the second threshold.

* * * * *